(No Model.)

I. YOUART.
PASTRY BOARD.

No. 345,470.                    Patented July 13, 1886.

WITNESSES:
C. Neveux
C. Sedgwick

INVENTOR:
I. Youart
BY Munn & Co.
ATTORNEYS.

UNITED STATES PATENT OFFICE.

ISABELLA YOUART, OF TROY, OHIO.

PASTRY-BOARD.

SPECIFICATION forming part of Letters Patent No. 345,470, dated July 13, 1886.

Application filed September 8, 1884. Serial No. 142,408. (No model.)

*To all whom it may concern:*

Be it known that I, ISABELLA YOUART, of Troy, in the county of Miami and State of Ohio, have invented a new and Improved Pastry-Board, of which the following is a full, clear, and exact description.

This invention consists in a pastry-board having an iron base and porcelain facing, the porcelain being applied to the iron in like manner as it is now applied to iron kettles and other cooking utensils or vessels lined with porcelain. Such pastry-board will be found greatly superior to the ordinary wooden board, inasmuch as it will be found both sweeter and cleaner, for the reason that all dough of which pastry is made contains lard or butter and greases whatever it comes in contact with, and so affects the board it is manipulated upon. This adhesion of the grease it is impossible to prevent, and in the case of a wooden board much scrubbing and washing is necessary to remove the grease, while my porcelain-faced pastry-board can as readily be cleaned as the marble "board" used for a like purpose; but it can be made so much cheaper than a board made wholly of marble as to adapt it to general use, which a marble slab, on account of its great expense, is not. It also can be made lighter to handle and neater, and greatly superior to wood for cleanliness.

Reference is to be had to the accompanying drawings, forming a part of this specification, in which similar letters of reference indicate corresponding parts in both the figures.

Figure 1:
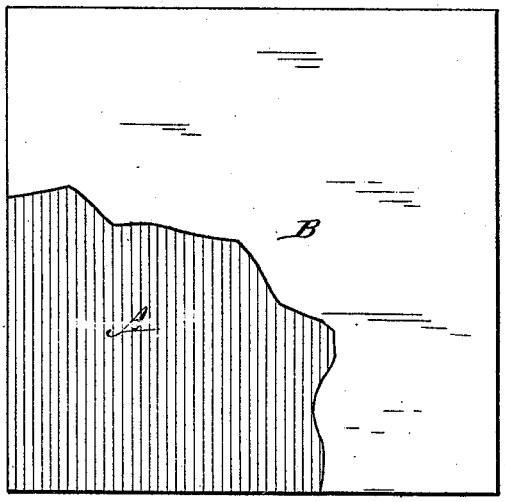
Figure 2:

Figure 1 represents a plan of a pastry-board having an iron base and porcelain facing, with a portion of the porcelain broken away to expose the iron; and Fig. 2 is a transverse section of the same.

In the drawings I illustrate the invention in its simplest form of construction—that is to say, as consisting of a plain flat iron base, A, with the porcelain enamel B applied to its one side or face; but it should be understood that the board may be hollowed out on its under side or otherwise be made much lighter than there shown, with or without a raised margin for the enamel, and may be made to present a much neater appearance than a plain board. It also may have the porcelain applied to both faces of it, if desired, and may be made of any convenient size, shape, and pattern.

If desired, the board may be constructed with a clamp or groove, to catch on the table, for the purpose of preventing the board from slipping about when in use.

Having thus described my invention, I claim as new and desire to secure by Letters Patent—

As a new article of manufacture, a porcelain-faced iron pastry-board, substantially as herein described.

ISABELLA YOUART.

Witnesses:
N. G. CULP,
SARAH MORRIS.